A. F. ZAHM.
CALCULATOR.
APPLICATION FILED APR. 28, 1916.

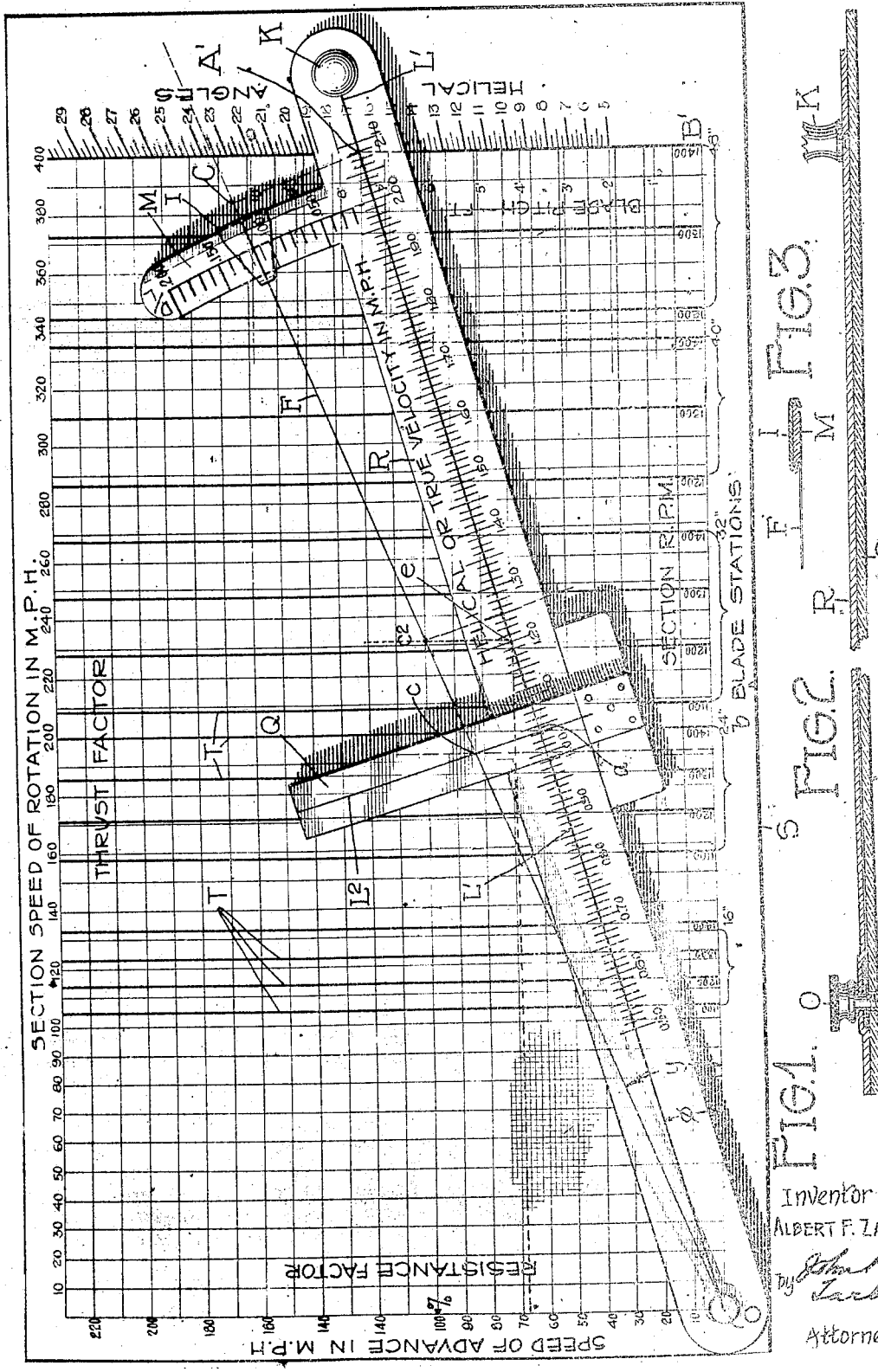

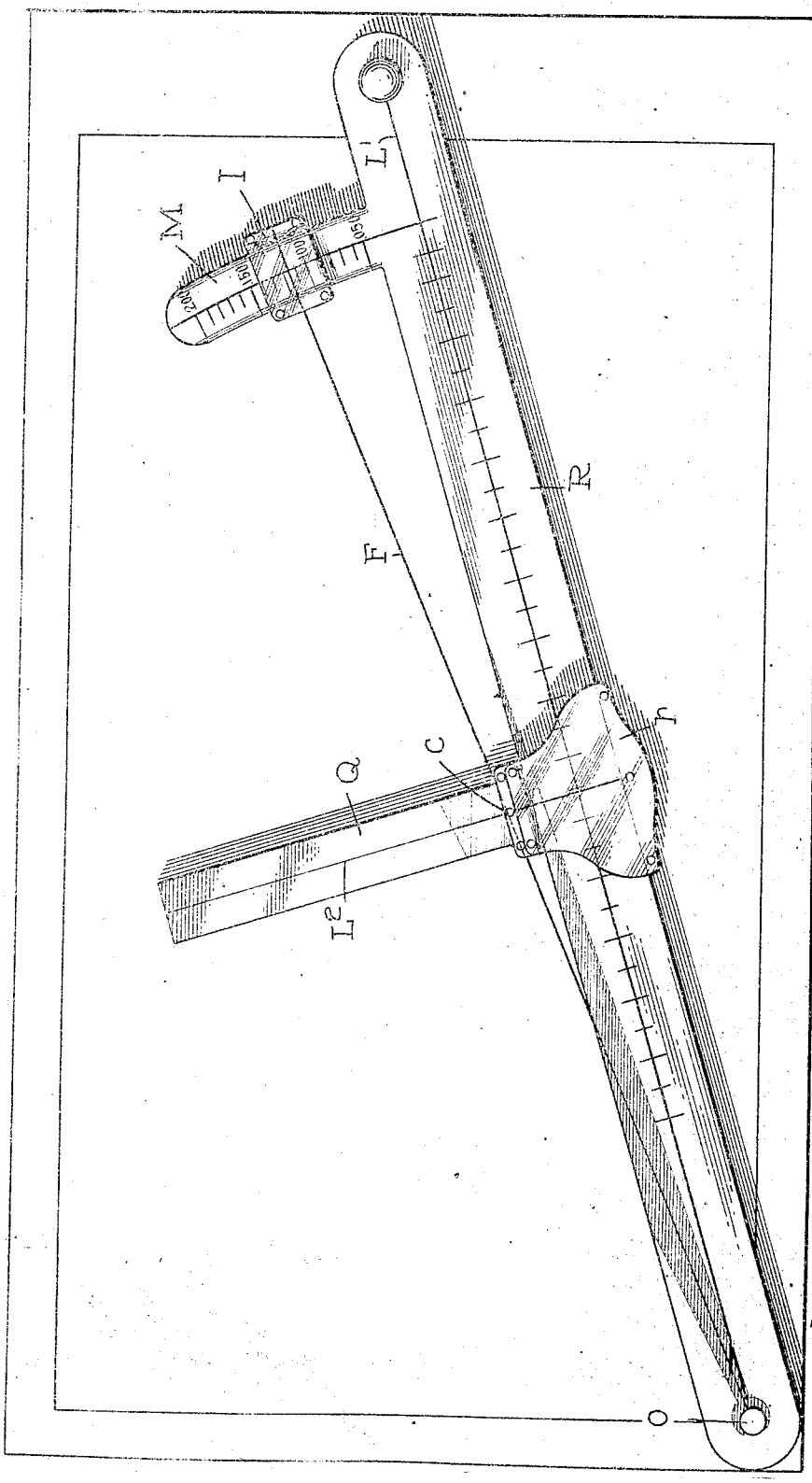

1,290,000.

Patented Dec. 31, 1918.
5 SHEETS—SHEET 3.

Inventor
ALBERT F. ZAHM.
by *Jno. P. Tarbox*
Attorney.

A. F. ZAHM.
CALCULATOR.
APPLICATION FILED APR. 28, 1916.
1,290,000.
Patented Dec. 31, 1918.
5 SHEETS—SHEET 5.
FIG.12.
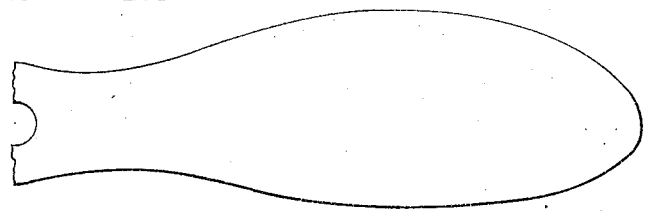
FIG.13.
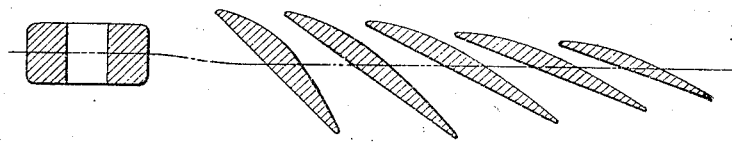
FIG.14.
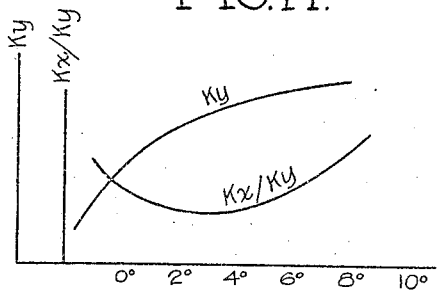
FIG.15.
| | (1) | (2) | (3) | (4) | (5) | (6) | (7) | (8) | (9) | (10) | (11) | (12) | (13) |
|---|---|---|---|---|---|---|---|---|---|---|---|---|---|
| SEC. NO. | SEC. RAD. | CHORD LENGTH IN FEET | BLADE ANGLE | HELICAL ANGLE | ANGLE OF ATTACK | BLADE CURVE | LIFT CO-EFF. | DRIFT LIFT | SEC. EFF. | KV (.0051 v) | THRUST FACTOR | THRUST PER FT. RUN | TORQUE PER FT. RUN |
| 1 | | | | | | | | | | | | | |
| 2 | | | | | | | | | | | | | |
| ETC. | | | | | | | | | | | | | |
Inventor
ALBERT F. ZAHM.
By John P. Tarbox
Attorney

UNITED STATES PATENT OFFICE.

ALBERT F. ZAHM, OF BUFFALO, NEW YORK.

CALCULATOR.

1,290,000.  Specification of Letters Patent.  Patented Dec. 31, 1918.

Application filed April 28, 1916. Serial No. 94,136.

*To all whom it may concern:*

Be it known that I, ALBERT F. ZAHM, a citizen of the United States, residing at Buffalo, in the county of Erie and State of New York, have invented certain new and useful Improvements in Calculators, of which the following is a specification.

My invention belongs to that class of special caluculators designed especially to function in the rapid solution of a particular abstruse or prolix problem or set of such problems related to each other through peculiar sequence of mathematical operations. Such instruments are specialties and but a limited number of the large quota known to the art have found wide use. The utility of my invention has already proven so broad that it finds a high place in this limited group.

The solution of the problems connected with the exact design of aeronautical or other propellers by ordinary means, even allowing for a most generous use of the slide rule, is at best very arduous and tedious. It is more tedious because the solution is different not only for each different blade cross section or camber, but also is further different for each blade station according as that station is distant from the axis of rotation. Thus, a multiple number of solutions are necessary not only for blades having different characteristics and different diameters, but also for one and the same blade, one for each of a plurality of chosen stations along its length. Moreover, these solutions involve not simply one factor such as thrust or torque, but a multiple number of factors, such as helix angle, angle of blade incidence (or angle of attack), velocity of translation along the helical path, the efficiency, etc. The calculator of my invention not only gives all these values, but gives them at one and the same setting. The great advantages in its use at once become obvious, the work of hours becoming the work of moments.

In the accompanying drawings I show several embodiments of my invention. They are those now best known to me, but it will be quite obvious that my invention may be given many other embodiments without departing in any way from its generic spirit. The principal form shown is of a combined rotatable bar and slide type, but in both general and detail character it is markedly different from calculators of this type heretofore proposed.

Of the drawings:

Figure 1 is a plan view of one embodiment, shown largely in a diagrammatic fashion;

Fig. 2 is a longitudinal section of the pivoted bar constituting the principal element of the calculator;

Fig. 3 is a transverse section of an arm of this bar showing the mounting of the slide thereon;

Fig. 4 is a plan view of a second embodiment;

Fig. 5 is a transverse section of the pivoted bar showing the mounting of the longitudinal slide thereon;

Fig. 8 is a transverse section thereof showing the mounting of its longitudinal slide;

Fig. 12 is a diagram of a propeller blade;

Fig. 13 is a diagram showing the cross sections of the blade at various distances from its center;

Fig. 14 is a lift over drift diagram pertaining to a given blade section, and

Fig. 15 is a characteristic tabulation of values obtainable through the use of this instrument.

Figure 10:
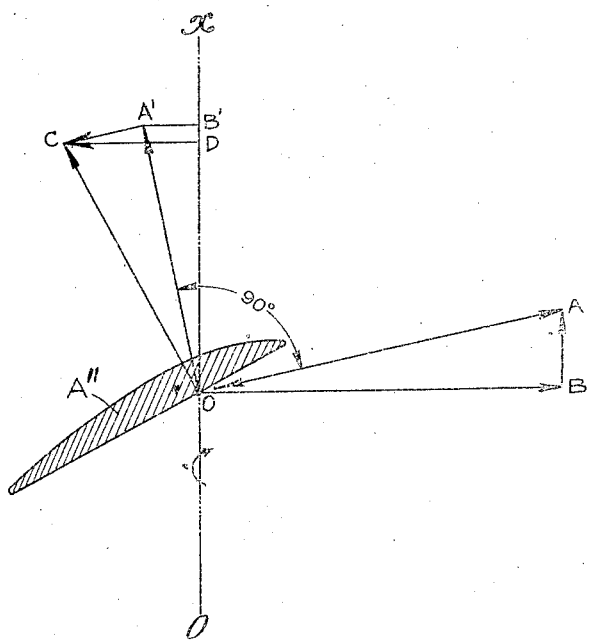
Fig. 10 is a diagram illustrating the forces pertainting to a blade section in operation.

Referring to Fig. 10, an aerofoil section $A''$ of a form suitable for a propeller blade section is illustrated as being rotated about an axis OX. We will assume that this section is at some distance from the axis, say several feet. If OB represents its linear velocity of rotation and BA that of advance, then OA represents its true velocity along the helical path, and AOB is the helical angle. The action of the section A'' on the air produces of itself OC which can be resolved into a lift force OA' at right angles to OA and in the general direction of the axis of rotation OX but not parallel thereto, and a resistance or "drift" force A'C parallel to OA and therefore perpendicular to the "lift" force OA'. The total reaction on section A therefore may be represented by OC. Its components OD, DC are respectively the propeller thrust and turning resistance.

Now triangles A'OB' and OAB while they are not equal (unless the diagrammatic scale is appropriately chosen), are nevertheless, similar, by virtue of their being right angle triangles having their hypotenuses and one side perpendicular respectively to each other. It is therefore our privilege to take the triangle AOB as a representative to scale of triangle A'OB'. This we do in the diagram of Fig. 11 and lay out upon the hypotenuse OA according to scale corresponding with that of triangle AOB the lift and drift forces of the triangle OA'C. Obviously, having made this transposition we have before us a considerably simplified diagram, yet one from which all the values of the diagram of Fig. 10 may be read. It is also clear that the forces in action upon any blade section may be similarly represented.

Figure 11:
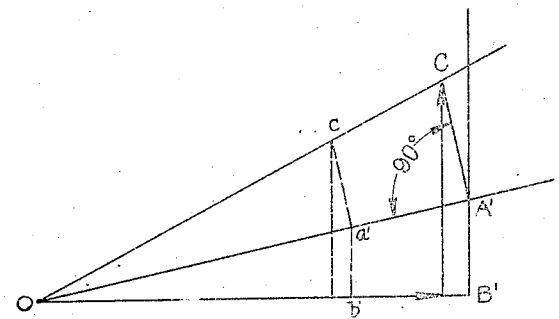
Fig. 11 is a diagram showing a composition of these forces effected through a transposition adapting them for a solution by this instrument.

The calculator of my invention is arranged in accordance with the transposition of Fig. 11. In each of the embodiments the relation of the diagram of Fig. 11 to the instrument is indicated by the application of the reference letters of the diagram to the plan view.

Referring then to the embodiment of Figs. 1, 2 and 3, and particularly to Fig. 1, this embodiment comprises a surface S cross sectioned by the system of rectangular coordinates having the usual decimal sub-divisions. Pivoted to the point O of the surface S is a bar R arranged to swing over the surface S. This bar is preferably of celluloid or other transparent material and bears on its surface a radial line $L^1$ formed by scoring, printing or otherwise. The pivot of this bar designated generally O is formed by a thumb screw passing through an eyelet in bar R and screw threaded into an eyelet in surface S. The outer end of bar R is provided with a small knob K for convenience in manipulation. Projecting upwardly from the outer end of the bar R is an arm M in the form of a sector about the center O. On this sector is arranged a slide I connected by a taut filament F with the center O. This filament may be in the form of a hair, thread, wire, or any equivalent thereof. See Fig. 3 for the details of this arrangement. A right angle slide or T-square Q is mounted upon bar R intermediate the center O and the arm M to slide thereover, the side of the bar R engaging the head of the square Q being formed as a straight edge and truly parallel to the radial line L'. The square Q like the bar R and the arm M is made of transparent material and carries the hairline $L^2$ formed in any suitable manner and lying at right angles to the radial hairline $L^1$ of the bar R.

The ordinates of the coördinate system of the surface S are graduated as indicated on the left margin in units of velocity of advance, the graduation in this case running from zero to 220 M. P. H. As indicated, these coördinates may also be graduated in resistance values, termed resistance factors. However, this scale may be omitted as illustrated, and the resistance factors deduced from the scale giving the velocity of advance. The abscissæ of the system are graduated, on the other hand, in several different ways, but according to correlated scales as are indeed all of the graduations. The lowermost series of graduations is in units of blade length, denominated "Blade stations" and reading from 16" to 48" by increments of 8". The uppermost graduation represents linear speed of rotation in M. P. H. Along this same line is laid off thrust if desired and indicated. Still a third graduation is made designating the speed of rotation in miles per hour for each blade station (16", 24", 32" and so on) at each of a plurality of R. P. M. Its graduation is denominated section R. P. M. By extending ordinate lines from this scale to the speed scale above the peripheral speed corresponding to the R. P. M. is read directly. On the right of the system there are two graduations by radial lines from the center O, the outer angular graduation running from 5 to 29° and the inner pitch graduation running from zero to 10 ft. These graduations are made according to the tangents of the angles represented by the velocity of advance divided by the velocity of rotation at the different stations. The angular graduations therefore represent helical angles.

The line L bears a graduated scale representing the lift factor, i. e.—0.005 × helical or true velocity in M. P. H. The arm or sector M bears radial graduations to the center O based upon line $L^1$ and reading from zero to .20 in units of the tangents of angles represented by the drift over lift ratio (D/L) of various blade sections.

The adaptability of my invention now becomes apparent. The scales of the various graduations set forth having been properly correlated to each other and being designated all in absolute units or other properly chosen correlated units, one has but to adjust the three movable elements, bar R, filament F and scale Q with respect to surface S and to each other to ascertain any desired values which appear in the analytical diagram of Fig. 11. For the base line OB' of the surface S represents the base line OB' of the diagram of Fig. 10; the hairline L' of bar R the line OA' or OA of the diagram, and the filament F the line OC of Fig. 11, while the ordinates of surface S in conjunction with the line $L^2$ of the square Q complete the pair of triangles. By simply in the first place setting the hairline L' according to the speed of rotation of the section of the propeller and the speed of the machine, both of which are known, in the second place setting slide I to place filament F at an angle represented by the drift over lift (D/L) ratio of the particular blade section being investigated, which is also known, and in the third place setting square Q at a point where line $L^2$ passes through the point of intersection of the rotative speed chosen and the line $L^1$ of bar R, the following values become immediately readable directly from the instrument;

(1) Section pitch,
(2) Helical angle,
(3) Linear velocity of rotation,
(4) True helical velocity,
(5) Lift factor,
(6) Thrust factor,
(7) Resistance factor,
(8) Efficiency.

For the triangles Oab and Oac are the triangles represented in the vector diagram of Fig. 11 and the scaled dimensions of their sides represent the true solutions of the problem to which the instrument is set.

The full merit of the invention will best be comprehended by the working out of a detail example by its use.

In Fig. 15 is a form commonly used for the tabulation of a large number of values obtained through propeller analysis. Illustrated in Figs. 12 and 13 is a typical propeller blade, and the shape of the sections thereof at the various stations which stations are arbitrarily chosen to be 8" apart. The radius of the section, that is, its distance from the axis of rotation, is entered in column 1 of the table of Fig. 15. The chord lengths as measured from the sections of Fig. 13 are entered in column 2. The blade angle as measured from the lay-out of these sections, or from the blade itself by suitable measuring instruments, is entered in column 3. Knowing the velocity of advance (the forward speed of the machine) and the R. P. M. of the driving motor (or of the propeller shaft), the helical angles are read on the instrument either at this stage or a later stage. The process consists in simply setting the line $L^1$ of bar R to pass through that point defined by the velocity of advance and the velocity of rotation at the particular section or station of the blade being investigated. Thus in the illustration of Fig. 1 the line $L^1$ is set at the intersection of a 60 mile speed of advance and 1400 R. P. M. of the 24" station, thus defining a helical angle of 17° and a pitch of 3.8 ft. Column 4 is thus filled in. The angle of attack is obtained by subtracting the values of column 4 from those of column 3 and placed in column 5. Column 6 identifies the blade section in question with known sections of aerofoils by appropriate designation. Columns 7 and 8 are filled in by values chosen from the lift and drift tables of the known curves with which the blade sections are identified. Such known characteristics of certain curves are diagrammatically shown in the drift over lift curves of Fig. 14. Sometimes these values are not plotted but are given in tables, but it is best to plot them so that intermediate values can be obtained.

Now, assuming we are examining the blade section at station 3 of the blade of Fig. 12, that is, the 24" station, the procedure is as follows: As shown by the table (Fig. 15) the section at the 24" station has a helical angle of 17° (this may be determined at this point if not done before) and a drift over lift coefficient of .116. Bar R is set with its line $L^1$ at 17° on the outer right hand scale. The slide I is set so that its connected filament F lies at point .116 on the scale of arm M, and the square Q is moved along bar R until its line $L^2$ crosses the point 60/1400 at which the line L' has been set. Preferably the calculations giving the helical angle and the angle of attack are not made until this stage of the operation and in this case the setting is made directly to the 60/1400 point defining the velocity of advance and velocity of rotation, and the helical angle 17° read and entered at this time, whereupon the angle of attack is obtained and slide I set as explained. This procedure calls for but one handling of the instrument whereas the other calls for two.

The instrument having been set, the reading Oa in the lift factor scale is taken and entered in column 10 of the form of Fig. 15. Its value is 1.037. This is a value proportionate to the total lift. It is also proportional to the true blade velocity which if needed can be read directly on the same same line $L^1$ as indicated. Next the abscissa of the point c is read on the thrust factor scale and entered in column 11. On this same scale may be read the velocity of rotation which we find is 192 M. P. H. Next the line of the filament F is followed until it reaches the 100% efficiency line, which for convenience in designating is located coincident with the coördinate whose ordinate is 100 on the speed of advance in M. P. H. scale. This locates a point $c^2$ vertically over e on the line L' such that the ordinate of e is the efficiency of the section. This value is approximately 68%. The efficiency of the section is computed by the formula $$E = \frac{\tan \phi}{\tan y}.$$

And since the triangles are similar to the triangles of the original layout of Figs. 10 and 11, the values may be read from the efficiency scale. This ratio based upon an arbitrarily chosen 100% line is quite as exact as if it were scaled from the particular triangles in question instead of read from similar triangles.

The values of columns 2, 7, 10 and 11 are multiplied to obtain column 12. Column 13 is obtained by using the formula $$\text{Torque} = C \times \frac{V}{N} \times \frac{\text{thrust}}{\text{efficiency}}$$

where C is a constant.

Thereupon a curve may be made from the values in columns 9, 12, and 13 and the areas inclosed by the thrust curve and torque curve ascertained by counting the squares, whereupon the following important values may be ascertained by the very simplest calculation.

$$\text{Thrust horse power} = \frac{TV}{550}$$

where V is in f. p. s.

$$\text{Torque horse power} = \frac{\text{Torque} \times 2\pi N}{33,000}$$

where N is in R. P. M.

$$\text{Overall efficiency} = \frac{\text{Thrust H. P.}}{\text{Torque H. P.}}$$

Figure 6:
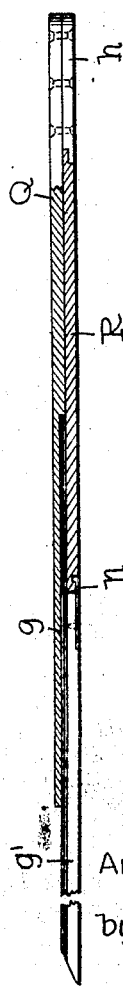
Fig. 6 is a transverse section of an arm of the bar showing the mounting of the slide thereon similar to Fig. 3.

The form of instrument of Figs. 4, 5 and 6 is not generally the same as that of Figs. 1, 2 and 3. The difference lies in the construction and mounting of the slide I and the square Q. Slide I is formed of glass and is mounted on arm M by means of rabbeted side strips $t$ into the rabbets of which project the reduced edges U of the arm M (Fig. 6). The square Q as shown in Fig. 5 is similarly secured to bar R. The head $h$ of the square is formed of glass while the body is preferably formed of celluloid or some other less fragile material secured thereto. In the case of the slide I the filament F is secured to the inner side thereof in radial extension of the radial lines formed on the face of the body of the slide, as indicated in Fig. 6. In the case of the square Q the line $L^2$ on the body of the square is co-incident with the line scored on the body $h$ at right angles to line $L^1$ of bar R.

Figure 7:
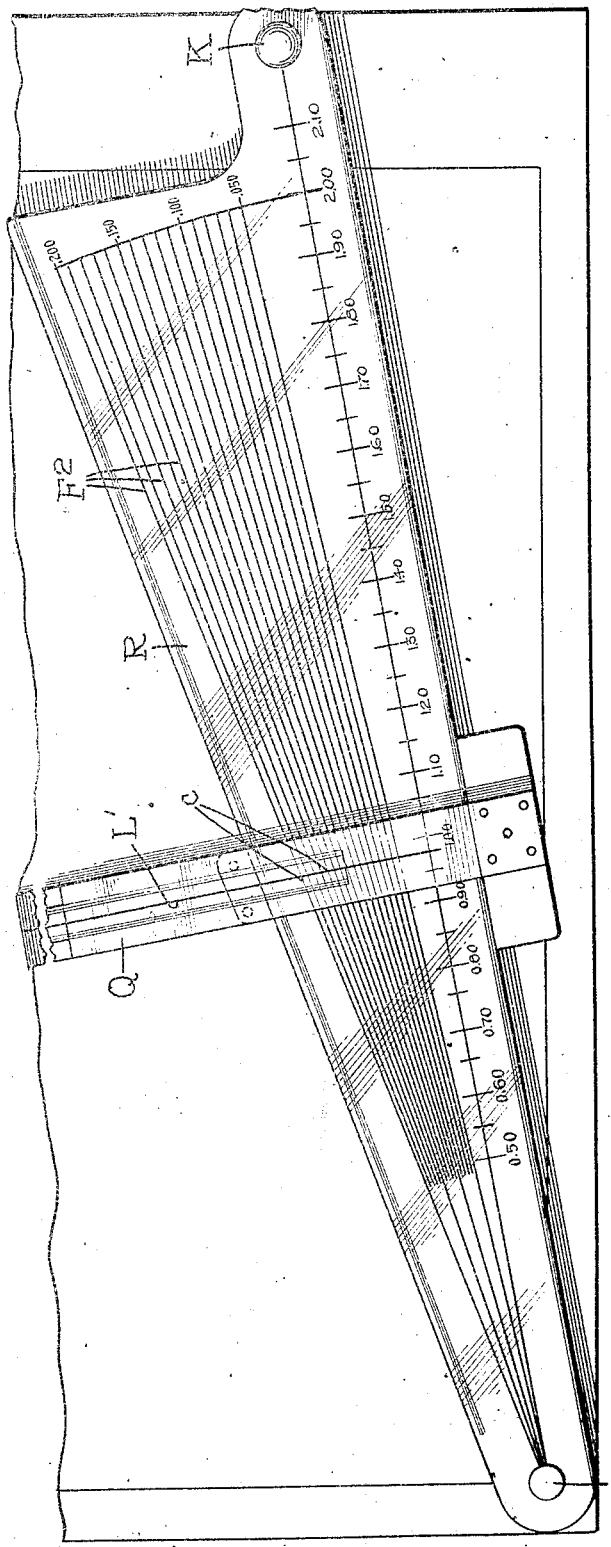
Fig. 7 is a plan view of still a third embodiment.
Figure 9:
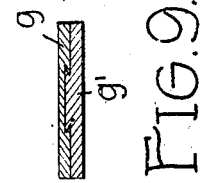
Fig. 9 is a transverse section of the longitudinal slide itself showing details of its mounting.

The form of Figs. 7, 8 and 9 is a departure from that of the preceding two forms in that the bar R is formed in the shape of a sector of a circle about the center O thereby eliminating the necessity for a branch arm M, slide I and filament F. The graduations before carried by arm M are made upon this sector, and radial lines from center O scored on the surface of the transparent body of the bar R take the place of filament F. The operation of the instrument is, however, substantially the same, there being selected that one of the radial lines $F^2$ which is designated by the drift over lift ratio of the scale, and this line followed to its intersection with the line $L^1$ of the square Q in the same manner as the filament F is so followed in the preceding forms. The sharp point of a lead pencil will be of assistance in this connection.

The square Q in this embodiment is peculiarly constructed. The head $h$ and the body $g$ are formed as in Fig. 1, but body $g$ is provided with an extension $g'$ having a dovetailed connection therewith as indicated in Fig. 9. Head $h$ has a rabbeted engagement with the bottom of the bar R while the extension $g'$ has a similar engagement through the medium of a spring $n$, the tip of spring $n$ sliding in a groove and moving extension $g'$ in and out as it passes over the body of the sector.

From the foregoing it is obvious that a large number of structural modifications may be made by those skilled in the art. Fundamentally, however, my invention will remain the same and it is from this fundamental standpoint that the appended claims setting forth the invention are to be considered.

What I claim is:

1. An instrument of the character described comprising a plane surface graduated in a system of rectangular coördinates, an arm pivoted at the axial center of said system of coördinates and arranged to be swept over said surface, a segmental extension of said arm graduated angularly with respect to said axial center and a square arranged on said arm to move parallel with the radius line thereof and projecting a line at right angles to said radius.

2. An instrument of the character described comprising a plane surface graduated in a system of rectangular coördinates, an arm pivoted at the axial center of said system so as to be swept over said surface, and a square arranged on said arm to be moved parallel to the radius line thereof and project a line at right angles to said radius.

3. An instrument of the character described comprising a plane surface, a graduated arm to be rotated thereover provided with a segmental extension, which said extension is provided with graduations defining radii extending through the center of rotation of said arm.

4. An instrument of the character described comprising a plane surface, graduated in coördinates, an arm pivoted at a coördinate center to be swept over said surface, a segmental extension on said arm, and a radial hairline connected with said center and adjustable over said segment to define various angles between the radius of said arm and itself.

5. An instrument of the character described comprising a plane surface laid off in coördinates, an arm of transparent material pivoted to a coördinate center to be swept over said surface, a graduated radius line drawn across the face of said arm, a square of transparent material arranged to be moved along said arm and bearing on its face a line at right angles to said radius line.

6. An instrument of the character described comprising a plane surface laid off in coördinates, an arm of transparent material pivoted to a coördinate center to be swept over said surface, a graduated radius line drawn across the face of said arm, a square of transparent material arranged to be moved along said arm and bearing on its face a line at right angles to said radius line, a segmental extension on said arm and a radially disposed hairline carried by said segmental extension.

7. An instrument of the character described comprising a plane surface, laid out in coördinates graduated according to correlated rotational and translational velocities of a propeller blade, angular graduations laid off from a given coördinate base line on radii passing through a coördinate center, an arm pivoted at said coördinate center arranged to sweep over said surface and having a radial line graduated to the same scale as said coördinates, said arm having a second graduation for said line in factors according to a scale proportional to but different from the first said scale, a segmental extension borne by said arm and having angular graduations radiated from said axial center and defining angles based upon the graduated line of said arm, and a square arranged to be moved along said arm and project a line at right angles to the graduated line thereof.

8. An instrument of the character described comprising a plane surface graduated in rectangular coördinates graduated according to translational and rotational velocities of a propeller, a coördinate line defining between a determinate base line and itself an arbitrarily chosen 100% coördinate division, an arm pivoted at the coördinate center of said base line and arranged to be swept over said surface, a segmental extension borne by said arm and radially subdivided into angles, and a square carried by said arm and arranged to project a line at right angles to said arm intersecting said radial subdivision.

9. An instrument of the character described, comprising a surface bearing a system of coördinates, a movable bar connected with said surface arranged to be set to define angles on said surfaces, an auxiliary member connected with the first said angle defining member arranged to define angles between said first member and itself.

10. An instrument of the character described comprising a surface bearing a system of coördinates, a movable bar connected with said surface arranged to be set to define angles on said surface, an auxiliary member connected with the first said angle defining member arranged to define angles between said first member and itself, and a measuring member adjustable along the length of the first said angle defining member.

11. An instrument of the character described comprising a surface graduated according to correlated but differently characterized values and two members movable thereover and coincidently set to define different angles with respect thereto, together with a third movable member carried by one of the aforesaid movable members and adjustable with respect thereto to define units of length of the other two.

12. An instrument of the character described comprising a fixed member bearing graduations in correlated values of two quantities, a member movable with respect thereto bearing graduation according to the resultant of said two quantities and arranged to define angles with respect to the graduations of said fixed member, and a second movable member arranged similarly to the first, and a third movable member connected with and adjustable with respect to one of the first two, and arranged to define the angular relation between the graduations of said surface and said first two movable members.

13. An instrument of the character described, comprising a fixed member having graduations in correlated translational and rotational velocities of a propeller, a member movable over the surface of the first, graduations according to the tangents of angles whose tangents are represented by the velocity of translation divided by the velocity of rotation on one of said relatively movable members, and graduations according to the drift over lift ratios of propeller sections on the other, together with a third movable member adjustable linearly of one of said members, said member to define the linear relation thereof to the other member.

14. An instrument of the character described, a pair of relatively movable members arranged to define angles by their relative movement, a third member movable relatively to the aforesaid pair and arranged to define angles with respect thereto, and a fourth member movable linearly with respect to the others, whereby to define units of length on one at least of the aforesaid members.

15. An instrument of the character described comprising a pair of relatively movable members arranged to define combination angles, a third member movable with respect to the pair aforesaid and arranged to define angles in combination with at least one of them, and a fourth member movable with respect to one of the aforesaid members and arranged to be set to measure the linear relations of certain of the aforesaid members.

In testimony whereof I affix my signature.

ALBERT F. ZAHM.